(12) United States Patent
Wallis et al.

(10) Patent No.: US 7,680,910 B2
(45) Date of Patent: Mar. 16, 2010

(54) SYSTEM AND METHOD FOR EFFICIENT TRANSFER OF APPLICATIONS AND DATA DURING DEVICE SWAP

(75) Inventors: Kenneth Wallis, Oakville (CA); Kamen B. Vitanov, Mississauga (CA); Viera Bibr, Kilbride (CA); Michael Shenfield, Richmond Hill (CA); Brindusa L Fritsch, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1029 days.

(21) Appl. No.: 11/360,573

(22) Filed: Feb. 24, 2006

(65) Prior Publication Data

US 2006/0234623 A1    Oct. 19, 2006

(51) Int. Cl.
*H04H 1/00* (2006.01)
(52) U.S. Cl. .................. 709/222; 709/203; 709/220; 717/168; 717/170
(58) Field of Classification Search .................. 709/222; 455/419, 412.1
See application file for complete search history.

(56) References Cited

U.S. PATENT DOCUMENTS

| | | | |
|---|---|---|---|
| 6,425,126 B1 * | 7/2002 | Branson et al. ............. | 717/168 |
| 2002/0178178 A1 | 11/2002 | Peng | |
| 2003/0101246 A1 | 5/2003 | Lahti | |
| 2003/0228866 A1 | 12/2003 | Pezeshki | |
| 2005/0027831 A1 * | 2/2005 | Anderson et al. ........... | 709/220 |
| 2005/0064868 A1 | 3/2005 | Coppinger et al. | |

FOREIGN PATENT DOCUMENTS

| | | |
|---|---|---|
| GB | 2294787 | 5/1996 |
| GB | 2406664 | 4/2005 |
| WO | WO 0241141 | 5/2002 |

* cited by examiner

*Primary Examiner*—Quang N. Nguyen
*Assistant Examiner*—Ruolei Zong
(74) *Attorney, Agent, or Firm*—Ogilvy Renault LLP

(57) ABSTRACT

A method for automatically registering the runtime environment and related component applications with an application gateway when transferring the applications from a first wireless device to a second wireless device is provided. Applications installed on the first wireless device are registered with an application gateway, which maintains a registration list of identification information for all registered wireless devices and applications installed thereon. A back-up is created of the applications and registration information for the runtime environment installed on the first wireless device for transfer to a second wireless device. An application container of the second wireless device determining installation and communicating to the application gateway identification information regarding the second wireless device and the restored applications. The application gateway registers the second wireless device by updating the registration list with the identification information for the second wireless device and the applications installed thereon.

3 Claims, 3 Drawing Sheets

SYSTEM AND METHOD FOR EFFICIENT TRANSFER OF APPLICATIONS AND DATA DURING DEVICE SWAP

FIELD OF THE INVENTION

The invention relates to management of applications and application registration information. More specifically, it relates to a method and a system for maintaining applications and application registration information during a device swap.

BACKGROUND OF THE INVENTION

When replacing an old wireless device with a new wireless device, it is convenient for users to be able to backup data saved on the old device and to restore it onto the new device. Such data existing on the old device includes user applications, the data associated with the user applications and application registration information, for applications which are registered with a mediating service in order to access a backend application service provider.

Current systems of backup/restore usually allow a user to transfer only application data from one device to another, while the user applications themselves and their associated application registration information cannot be saved and restored. With such systems, once the application data is transferred, all user-installed applications must be re-installed onto the new device, which may be time-consuming and inconvenient for the user. While some systems may allow for back-up of user-installed applications, these applications will need to be re-registered with the application mediating service following the transfer, which necessitates user/IT administrator intervention.

There exists therefore a need for a system allowing the replacement of one wireless device with another while maintaining the mediating service environment and without requiring user interaction.

BRIEF DESCRIPTION OF THE DRAWINGS

These and other features, aspects and advantages of the present invention will become better understood with regard to the following description and accompanying drawings wherein.

DETAILED DESCRIPTION

According to a first broad aspect of the present invention, there is provided a method for automatically registering applications with an application gateway when transferring said applications from a first wireless device to a second wireless device, comprising: registering an application installed on said first wireless device with said application gateway by providing identification information for said first wireless device and said application; said application gateway maintaining a registration list of identification information of registered wireless devices and applications installed on said registered wireless devices; creating a back-up of said applications and registration information for said applications installed on said first wireless device; installing said applications and said registration information for said applications from said back-up onto a second wireless device; communicating to said application gateway identification information regarding said second wireless device and said restored applications; and said application gateway registering said second wireless device by updating said registration list with said identification information for said second wireless device and said applications installed on said second wireless device.

According to a second broad aspect of the present invention, there is provided an application gateway for automatically registering applications therewith when transferring said applications from a first wireless device to a second wireless device, comprising: memory means storing a registration list of identification information of registered wireless devices and applications installed on said registered wireless devices; communication means for receiving identification information regarding said second wireless device and said restored applications; and update means for updating said registration list with said identification information for said second wireless device and said applications installed on said second wireless device.

Figure 1:
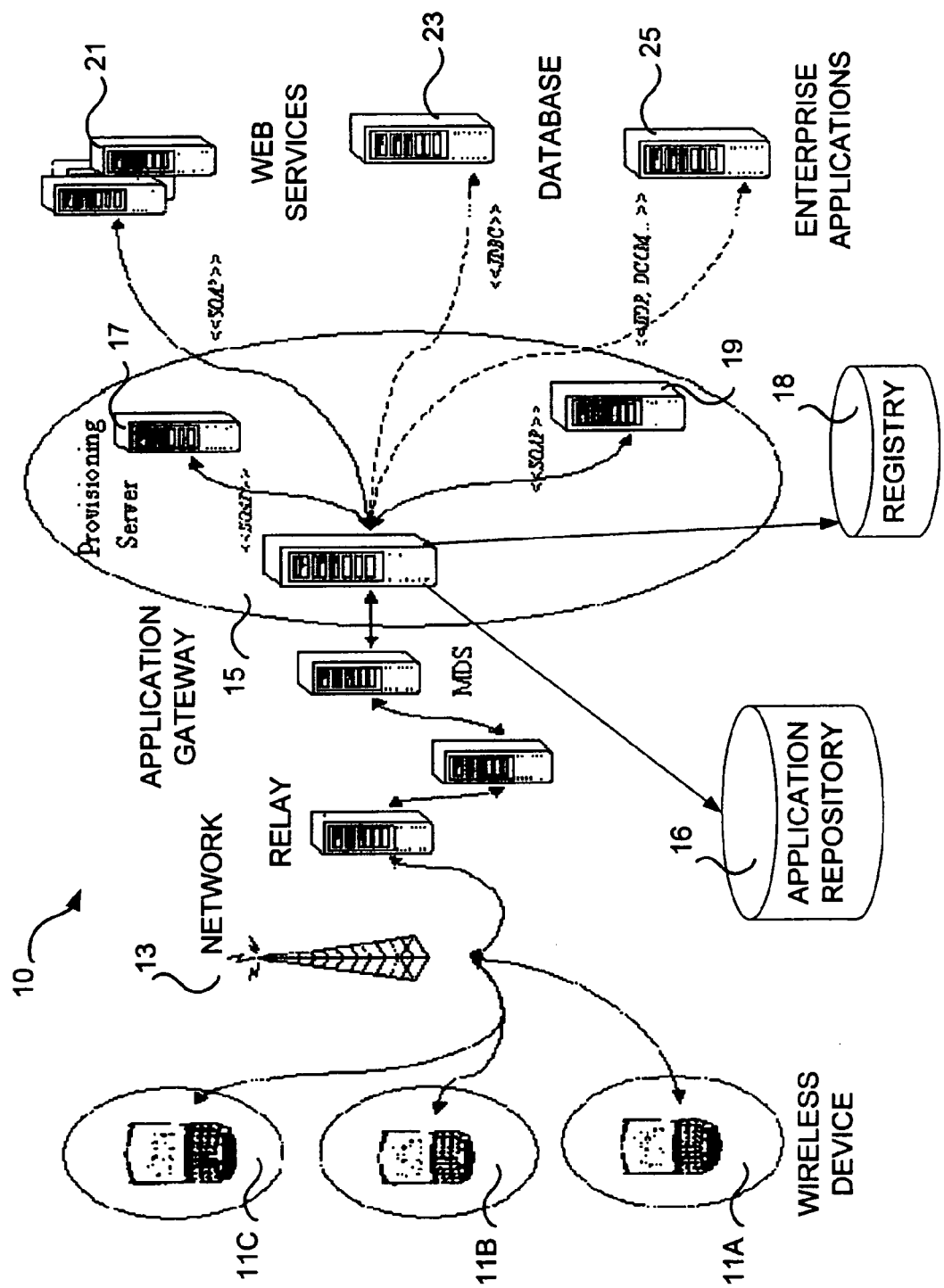
FIG. 1 is a block diagram of a communication network system adapted in accordance with an embodiment of the present invention.

Referring to FIG. 1, a network system 10 comprises mobile communication devices 11 for interacting with one or more backend data sources 21, 23, 25 (e.g. a schema based service such as web services or database that provides enterprise services used by an application) via a wireless network 13 coupled to an application gateway 15. The devices 11A, 11B, 11C are devices such as, but not limited to, mobile telephones, PDAs, two-way pagers, dual-mode communication devices. The network 10 can also have desktop computers (not shown) coupled though a local area network. The devices 11A, 11B, 11C and desktop computers of the network 10 are hereafter referred to as the devices 11 for the sake of simplicity. It is recognized that the application gateway 15 and data sources 21, 23, 25 can be linked via extranets (e.g. the Internet) and/or intranets as is known in the art. The application gateway 15 handles request/response messages initiated by the applications on the devices 11, as well as subscription notifications pushed to the devices 11 from the data sources 21, 23, 25. The Application Gateway 15 can function as a Data Mapping Server for mediating messaging between a client runtime environment (RE) on the device 11 and a backend server of the data sources 21, 23, 25. The Runtime Environment (RE) is an intelligent container that executes application components and provides common services as needed for execution of the applications. The application gateway 15 can provide for asynchronous messaging for the applications and can integrate and communicate with legacy backend data sources 21, 23, 25. The devices 11 transmit and receive the Wireless Component Applications technology or wireless component applications, as further described below, when in communication with the data sources 21, 23, 25, as well as transmit/receive messaging associated with operation of the applications. The devices 11 can operate as web clients of the data sources 21, 23 and 25 through execution of the applications when provisioned on respective runtime environments (RE) of the devices 11.

For satisfying the appropriate messaging associated with the applications, the application gateway 15 communicates with the data sources 21, 23 and 25 through various protocols (such as but not limited to HTTP, SQL, and component API) for exposing relevant business logic (methods) to the applications once provisioned on the devices 11. The applications can use the business logic of the data sources 21, 23 and 25 similarly to calling a method on an object (or a function). It is recognized that the applications can be downloaded/uploaded in relation to data sources 21, 23, 25 via the network and application gateway 15 directly to the devices 11. For example, the application gateway 15 is coupled to a provisioning server 17 and a discovery server 19 for providing a mechanism for optimized over-the-air provisioning of the applications, including capabilities for application discovery from the device 11 as listed in a UDDI (for example) registry 18. The Registry 18 can be part of the Discovery Service implemented by the server 19, and the registry 18 is used for publishing the applications. The application information in the registry 18 can contain such as but not limited to a Deployment Descriptor DD (contains information such as application name, version, and description) as well as the location of this application in an application repository 16.

Referring to FIG. 1, in one embodiment of the present invention, for initialization of the runtime environment RE, the RE receives the application gateway 15 URL. If the operating environment is defined to be secure, then the RE will include its public key in a security handshake with the application gateway 15. The application gateway 15 will pass its public key in the synchronous response to the security handshake. While use of the MDS service book is one possible way of implementing the device initialization/configuration protocol, those skilled in the art will appreciate that other implementations are also possible. For example, the above functionality may also be implemented using IT Policies.

The runtime environment RE uses this information to connect to the gateway 15 for initial handshaking. It is recognized there could be more than one gateway 15 in the network 10, as desired. Once initialized, access to the applications by the devices 11, as downloaded/uploaded, can be communicated via the gateway 15 directly from the application repository 16, and/or in association with data source 21, 23, 25 direct access (not shown) to the application repository 16.

Figure 2:
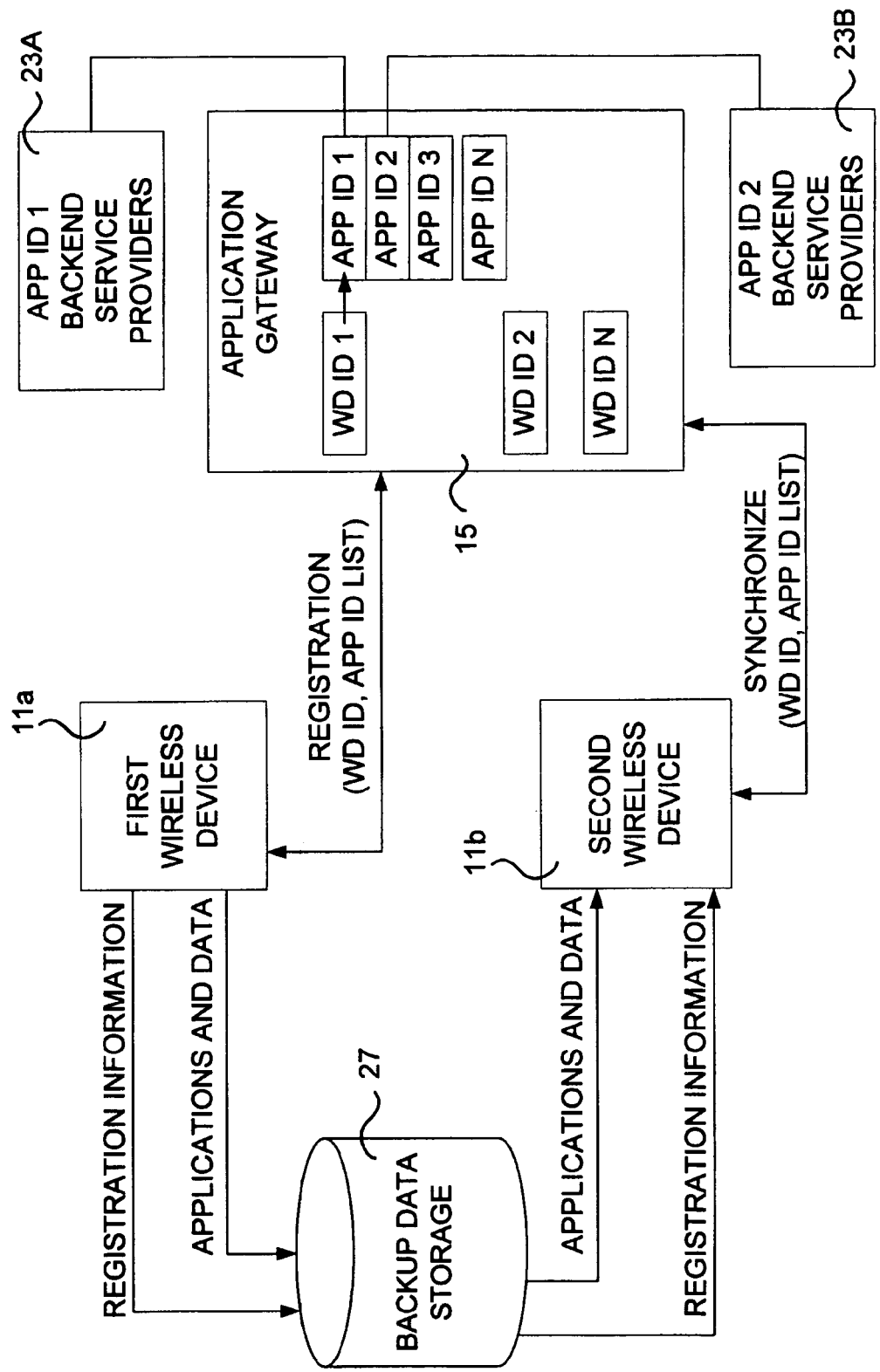
FIG. 2 is a block diagram of a system for efficient transfer of applications from a first wireless device to a second wireless device, according to an embodiment of the present invention.

Now, with respect to FIG. 2, a system enabling transfer of applications and data during a swap will be described. A first wireless device 11a is in communication with an application gateway (AG) 15. As explained above, the application gateway 15 is a server (or servers) responsible for managing communication between wireless devices and backend applications (which may include, but is not limited to, databases, internet web services). The AG 15 handles transforming wireless device messages encoded in a specific format into the format expected by the particular backend application the message is intended for. The AG 15 also handles discovery and provisioning requests from wireless devices, and, in certain embodiments, provides many administrative functions for managing the wireless devices themselves.

The AG 15 is in communication with a plurality of backend application service providers 23a, 23b, supporting a plurality of user applications.

An example of a backend service 23 could be a web service that provides random famous historic quotes. A component application would be written to request a random quote from the web service 23 and display it on the device 11. The component application would encode this request in a compact, efficient way and send it to the application gateway 15. The application gateway 15 would transform this request into a format compatible with the web services communication protocol and forward the request to the appropriate backend service provider 23. The reverse process would happen with the response from the web service containing the random quote.

The AG 15 maintains a registration list storing identification information for registered wireless devices 11 and applications installed on the registered wireless devices 11. For example, when the first wireless device 11a first communicates with the server 19, the identification information of the first wireless device 11 is stored on the AG 15. This way, a record will be created for the first wireless device 11a on the AG 15. At the time of provisioning of each application on the wireless device 11, the AG 15 will make an entry in the wireless device 11 record to associate this application with this device. This is done so that the application gateway 15 may know which devices have which applications installed thereon.

The registration protocol between the device 11 and the application gateway will now be described. Following the device 11 receiving the AG URL in some way, as previously described, the device 11 sends a "security handshake" to the AG 15, including the device's public key if operating in a secure environment. This handshake is preferably a synchronous communication. The response back from the AG 15 gives the device 11 the AG public key (if in a secure environment), as well as other administrative information. The device 11 then sends a status message to the AG 15 including information such as the runtime environment version installed on the device 11, etc. The status message is a generic status message that would normally include more information, but not on a first registration. It is used as a trigger for the rest of the registration sequence. When the AG 15 receives this status message, it then sends to the device 11 (asynchronously) administrative privilege information and other information. An example of administrative privileges would be specifying whether the AG 15 allows the device 11 to discover applications, or if the device 11 is allowed to request an application to be provisioned.

The first wireless device 11a contains component applications and associated data and the application gateway registration information.

The ability to backup the component applications themselves, as opposed to just the application data, is facilitated by the fact that the component applications themselves are defined as "metadata", by using a combination of XML and ECMAscript.

In case of transfer of the applications from the first device to a new (second) device, the AG registration information allows the new device to detect that there has been a device swap. One possible way of detecting that there has been a device swap is to use the device PIN which is part of the registration information contained in the runtime environment and therefore backed up. When the registration information is loaded onto the new (second) device and the RE starts for the first time, it compares the stored device PIN against the current device's PIN, and if they are different, a device swap will be detected.

The backup data storage 27 may be a hard disk, a floppy disk, or any other memory means, portable or not, which can be connected to a first wireless device 11a in order to store the existing applications and applications data, as well as the MS registration information, before a device swap.

The backup data storage 27 is also connected to a second wireless device 11b for transferring the applications and application data, as well as the AG registration information, backed-up from the first wireless device 11a. The second wireless device 11b, just like the first one, has installed a mediating service-enabling container application (MSCA), or a runtime environment, which acts as a container for applications wishing to interact with the AG 15. The second wireless device 11b is in communication with the AG 15 for synchronizing the registration information and the component applications installed following a transfer. When the information is restored to the second wireless device 11b, the MSCA determines that the wireless device has been changed and notifies the AG 15 accordingly. The AG 15 updates its internal registration list by either a) modifying the record of the first wireless device to refer to the second wireless device or b) adding a new entry for the second wireless device. The MSCA of the second wireless device 24 also sends a status message to the AG 15 including information regarding the set of installed (restored) applications. The AG 15 will synchronize with this list, updating its registration list of installed applications for the wireless device 11b. In one embodiment of the present invention, the AG 15 also maintains a support list of all applications supported and their respected application service providers. Following transfer of applications from the first device 11a to the second device 11b, the AG 15 will consult the support list and determine whether any one of the restored applications is no longer supported, i.e. not found on the support list. This step is necessary in order to synchronize for changes on the wireless device side and/or the AG 15 side between the time the backup was performed and the restore occurred. If any of the applications on the second wireless device 11b are not found on the support list, the AG 15 proceeds to delete those applications from the wireless device 11b.

Figure 3:
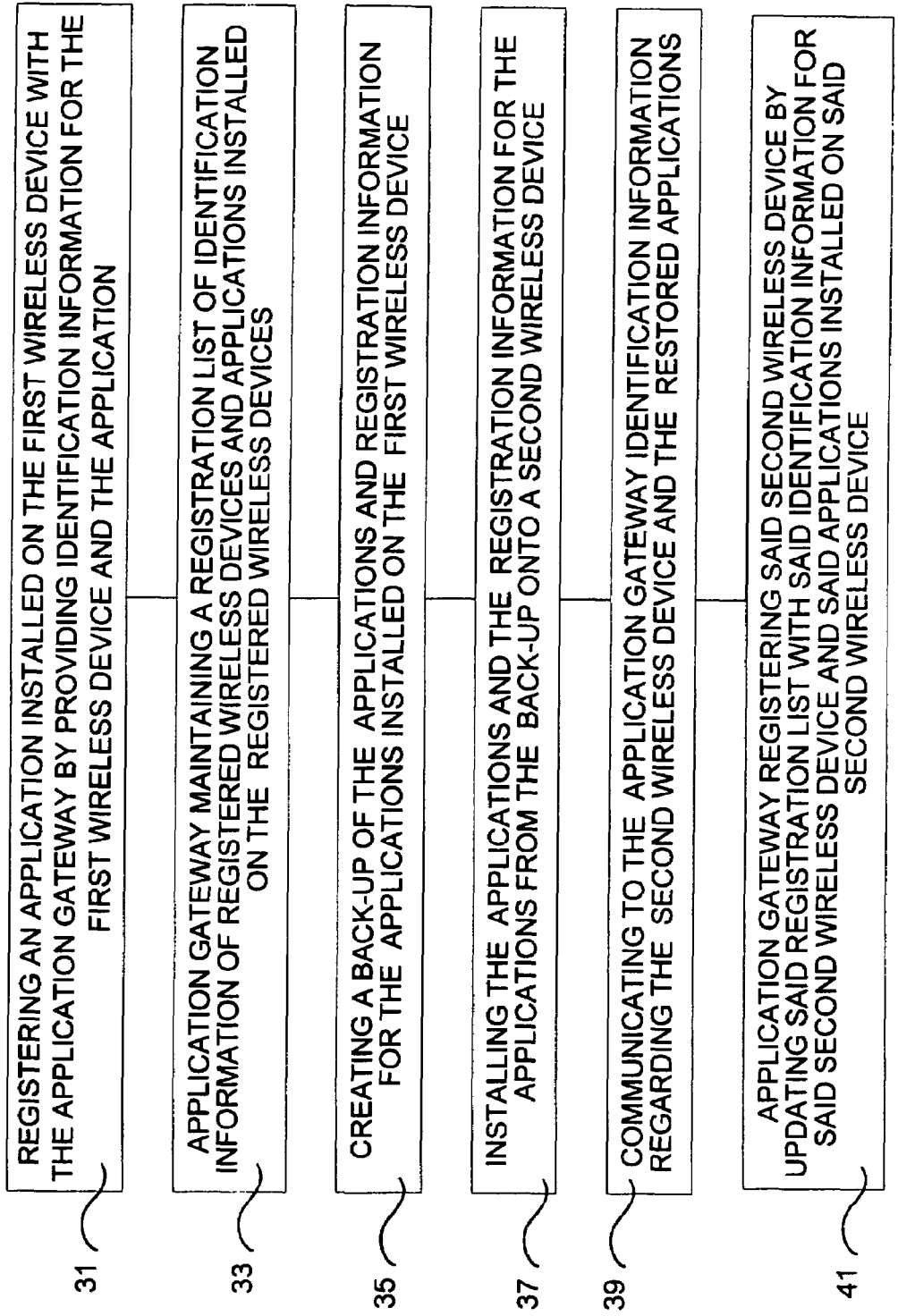
FIG. 3 is a flow chart of a method for efficient transfer of applications from a first wireless device to a second wireless device, according to an embodiment of the present invention.

With respect to FIG. 3, there is illustrated a flow chart of a method for efficient transfer of applications from a first wireless device to a second wireless device, according to the present invention. In a first step 31, the application installed on the first wireless device is registered with the application gateway by providing identification information for the first wireless device and the application. In a next step 33, the application gateway maintains a registration list of identification information of registered wireless devices and applications installed on the registered wireless devices. In step 35, a back-up is created for the applications and registration information for the applications installed on the first wireless device. In step 37, the applications and the registration information for the applications from the back-up are installed onto a second wireless device. In step 39, identification information regarding the second wireless device and the restored applications is communicated to the application gateway. In step 41, the application gateway registers the second wireless device by updating the registration list with the identification information for the second wireless device and the applications installed on the second wireless device.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before and as set forth, and as follows in the scope of the appended claims.

What is claimed is:

1. An application gateway for automatically registering applications therewith when transferring said applications from a first wireless device to a second wireless device, comprising:

a data storage storing a registration list of identification information of registered wireless devices and applications installed on said registered wireless devices, and a back-up of applications, said back-up including said applications and registration information for said applications installed on said first wireless device;

a receiver for receiving identification information for said first wireless device and said applications installed on said first wireless device, and receiving identification information regarding said second wireless device and said applications installed from said back-up of applications and associated registration information in said data storage onto said second wireless device;

a processor configured for updating said registration list with said identification information for said second wireless device and said applications installed from said back-up on said second wireless device;

wherein said data storage further comprises a support list of applications supported by application service providers;

and wherein said processor is further configured for, following transfer of applications from said first device to said second device, matching said applications installed from said back-up of applications and associated registration information in said data storage onto said second wireless device with applications on said support list and deleting unmatched applications from said second wireless device.

2. A method of automatically registering applications in an application gateway when said applications are being transferred from a first wireless device to a second wireless device in a wireless network comprising a plurality of wireless devices registered with said application gateway, comprising:

registering applications installed on said first wireless device by receiving from said first wireless device identification information for said first wireless device and said applications;

maintaining a registration list of identification information of registered wireless devices and applications installed on said registered wireless devices;

receiving identification information regarding said second wireless device and applications installed from a back-up stored in a back-up storage onto said second wireless device, said back-up comprising said applications and registration information for said applications installed on said first wireless device;

registering said second wireless device by updating said registration list with said identification information for said second wireless device and said applications installed from said back-up on said second wireless device;

maintaining, at said application gateway, a support list of applications supported by application service providers;

following transfer of applications from said first device to said second device, matching said applications installed from said back-up onto said second wireless device with applications on said support list; and deleting unmatched applications from said second wireless device following said transfer.

3. The method as claimed in claim 2, wherein said updating said registration list comprises modifying a record of said first wireless device to refer to said identification information of said second wireless device.

* * * * *